(12) United States Patent
Strohl et al.

(10) Patent No.: US 11,339,668 B2
(45) Date of Patent: May 24, 2022

(54) METHOD AND APPARATUS FOR IMPROVING COOLING OF A TURBINE SHROUD

(71) Applicant: Chromalloy Gas Turbine LLC, Palm Beach Gardens, FL (US)

(72) Inventors: James Page Strohl, Stuart, FL (US); Mariano Medrano, Okeechobee, FL (US); David G. Parker, Jupiter, FL (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 44 days.

(21) Appl. No.: 16/173,410

(22) Filed: Oct. 29, 2018

(65) Prior Publication Data
US 2020/0131913 A1 Apr. 30, 2020

(51) Int. Cl.
*F01D 5/18* (2006.01)
*F01D 5/22* (2006.01)

(52) U.S. Cl.
CPC ............. *F01D 5/187* (2013.01); *F01D 5/225* (2013.01); *F05D 2230/233* (2013.01); *F05D 2230/235* (2013.01); *F05D 2240/307* (2013.01); *F05D 2240/81* (2013.01); *F05D 2260/201* (2013.01); *F05D 2260/22141* (2013.01)

(58) Field of Classification Search
CPC . F01D 5/20; F01D 5/225; F01D 5/187; F05D 2240/307; F05D 2240/81; F05D 2260/201
See application file for complete search history.

(56) References Cited

U.S. PATENT DOCUMENTS

| | | | |
|---|---|---|---|
| 4,142,824 A | 3/1979 | Andersen | |
| 4,761,116 A | 8/1988 | Braddy et al. | |
| 6,099,253 A | 8/2000 | Fukue et al. | |
| 6,173,491 B1 * | 1/2001 | Goodwater | B23P 6/002 29/889.1 |
| 6,491,498 B1 | 12/2002 | Seleski et al. | |
| 7,726,944 B2 * | 6/2010 | Page | F01D 5/20 416/92 |

(Continued)

OTHER PUBLICATIONS

PCT Application No. PCT/US2019/058340, International Search Report and Written Opinion, dated Jan. 14, 2020, 9 pages.

(Continued)

*Primary Examiner* — Eldon T Brockman
*Assistant Examiner* — Danielle M. Christensen
(74) *Attorney, Agent, or Firm* — Avek IP, LLC

(57) ABSTRACT

A system and method for cooling a turbine blade tip shroud is provided. The turbine blade comprises a blade attachment, a platform extending radially outward from the attachment, an airfoil extending radially outward from the platform, and a tip shroud extending radially outward from the airfoil. The tip shroud has one or more knife edges extending radially outward from an outer surface of the tip shroud. One or more cooling passages extend through the airfoil and to the tip shroud. The turbine blade also includes one or more tip plates secured at or near the outer surface of the tip shroud thereby forming a plenum between the outer surface and the one or more tip plates. The one or more tip plates also include a plurality of cooling holes for flowing cooling air through the plenum to cool the tip shroud.

19 Claims, 11 Drawing Sheets

(56) References Cited

U.S. PATENT DOCUMENTS

| | | | |
|---|---|---|---|
| 8,322,986 B2* | 12/2012 | DeSander | F01D 5/187 |
| | | | 416/96 R |
| 9,127,560 B2* | 9/2015 | Collier | F01D 5/187 |
| 9,995,157 B2* | 6/2018 | Bangerter | F01D 9/041 |
| 2002/0162220 A1 | 11/2002 | Updegrove et al. | |
| 2008/0170946 A1 | 7/2008 | Brittingham et al. | |
| 2009/0180892 A1 | 7/2009 | Brittingham | |
| 2009/0180895 A1 | 7/2009 | Brittingham et al. | |
| 2010/0024216 A1 | 2/2010 | Desander et al. | |
| 2013/0142649 A1 | 6/2013 | Collier et al. | |
| 2014/0161625 A1* | 6/2014 | Zhang | F01D 5/187 |
| | | | 416/96 R |
| 2017/0138203 A1* | 5/2017 | Jaiswal | F01D 5/186 |

OTHER PUBLICATIONS

Notice of Allowance, dated Jun. 14, 2021, 8 pages, issued in U.S. Appl. No. 16/173,714.

* cited by examiner

FIG. 1 – Prior Art

METHOD AND APPARATUS FOR IMPROVING COOLING OF A TURBINE SHROUD

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to a system and process for enhancing the cooling of a gas turbine blade shroud. More specifically, embodiments of the present disclosure comprise a tip plate secured to a shroud of the turbine blade with cooling holes placed therein in order to improve cooling throughout the shroud.

BACKGROUND OF THE DISCLOSURE

A gas turbine engine typically comprises a multi-stage compressor coupled to a multi-stage turbine via an axial shaft. Air enters the gas turbine engine through the compressor where its temperature and pressure increase as it passes through subsequent stages of the compressor. The compressed air is then directed to one or more combustors where it is mixed with a fuel source, creating a combustible mixture. The mixture is ignited in the combustors, creating a flow of hot combustion gases, which are directed into the turbine causing the turbine to rotate, thereby driving the compressor. The output of the gas turbine engine can be mechanical thrust through exhaust from the turbine or shaft power from the rotation of an axial shaft, where the axial shaft can drive a generator to produce electricity.

The compressor and turbine each comprise a plurality of rotating blades and stationary vanes having an airfoil extending into the flow of compressed air or hot combustion gases. Each blade or vane has a particular set of design criteria which must be met in order to provide the necessary work to the air or gas passing through the compressor and the turbine, respectively. However, due to the severe nature of the operating environments especially prevalent in the turbine, it is often necessary to cool the turbine components.

Depending on the location of the blade in the turbine, the blade may also include a shroud. The shroud is often located at the blade tip and extends circumferentially outward from the blade tip. The shroud is sized to contact a shroud of an adjacent blade in order to dampen any vibrations as well as to serve as a radially outermost point of the flow path for the turbine stage.

Often times, gas turbine blades are cooled and include a plurality of cooling passageways. The plurality of cooling passageways is often complex in shape and may include internal features to maximize the efficiency of cooling fluid passing therethrough. One such configuration of a cooled turbine blade is shown in FIG. 1. In this configuration, a turbine blade 100 includes a plurality of radially extending cooling holes 102 for cooling the airfoil 120. However, a tip shroud 130 is uncooled except where the cooling holes 102 discharge cooling air. This creates a large thermal gradient in the tip shroud 130 and thermal stresses between the tip shroud 130 and the airfoil 120. Also, the uncooled regions of the tip shroud 130 operate at a higher temperature than other regions of the tip shroud 130, resulting in shroud curl and potential mismatch with the adjacent shroud, resulting in possible vibrations and wear to the turbine blade shroud regions.

BRIEF SUMMARY OF THE DISCLOSURE

The present disclosure relates to a method and apparatus for improving cooling of a turbine blade shroud.

In an embodiment of the present disclosure, a turbine blade is disclosed where the turbine blade comprises a blade attachment, a platform extending radially outward from the attachment, and an airfoil extending radially from the platform. The turbine blade further comprises a tip shroud extending circumferentially from the airfoil where the tip shroud has one or more knife edges extending radially outward from an outer surface of the tip shroud. One or more cooling passages extend through the airfoil and to the tip shroud. The turbine blade also includes one or more tip plates secured to the outer surface of the tip shroud thereby forming a plenum between the outer surface and the one or more tip plates. The one or more tip plates also include a plurality of cooling holes, where the plurality of cooling holes is positioned at least adjacent the one or more knife edges.

In an alternate embodiment of the present disclosure, a method of enhancing cooling of a turbine blade tip shroud is provided. The method comprises forming a tip plate sized to fit over at least a portion of the tip shroud, placing a plurality of cooling holes in the tip plate, and securing the tip plate a distance from the tip shroud thereby forming a plenum between the tip plate and the tip shroud. A flow of air is directed through cooling passages in the airfoil and to the plenum and the flow of air passes through the plurality of cooling holes in the tip plate, thereby increasing cooling flow to the tip shroud.

In yet another embodiment of the present disclosure, a method of forming a cooled tip shroud for a gas turbine blade is disclosed. The method comprises providing a gas turbine blade having an air cooled passageway and a tip shroud and determining an area of the tip shroud to be cooled. A tip plate is formed for the area of the tip shroud to be cooled and a plurality of cooling holes are placed in the tip plate. The surfaces of the tip shroud to which the tip plate will be secured is prepared and cleaned and the tip plate is fixed to the tip shroud, thereby forming a plenum between the tip shroud and the tip plate.

These and other features of the present disclosure can be best understood from the following description and claims.

BRIEF DESCRIPTION OF THE SEVERAL VIEWS OF THE DRAWINGS

The present disclosure is described in detail below with reference to the attached drawing figures, wherein.

DETAILED DESCRIPTION OF THE DISCLOSURE

The present disclosure is intended for use in a gas turbine engine, such as a gas turbine used for aircraft engines and/or power generation. As such, the present disclosure is capable of being used in a variety of turbine operating environments, regardless of the manufacturer.

As those skilled in the art will readily appreciate, such a gas turbine engine is circumferentially disposed about an engine centerline, or axial centerline axis. The engine includes a compressor, a combustion section and a turbine with the turbine coupled to the compressor via an engine shaft. As is well known in the art, air compressed in the compressor is mixed with fuel in the combustion section where it is burned and then expanded in the turbine. The air compressed in the compressor and the fuel mixture expanded in the turbine can both be referred to as a "hot gas stream flow." The turbine includes rotors that, in response to the fluid expansion, rotate, thereby driving the compressor. The turbine comprises alternating rows of rotary turbine blades, and static airfoils, often referred to as vanes. The hot gas stream flow exiting the gas turbine engine can provide thrust for an aircraft or used in a subsequent power generation process, such as steam generation, in a combined cycle power plant.

Due to the temperatures of the hot gas stream flow, which can be well over 2,000 deg. F., it is necessary to cool the turbine blades and static airfoils, or vanes, as operating temperatures are often equal to or greater than the material capability of the cast turbine components. However, in order to most effectively cool critical surfaces of the turbine components, often a complex internal cavity of the gas turbine blade or vane is required. Producing such a complex internal cooling scheme, especially with smaller aerospace components, is extremely difficult.

The typical process for cooling airfoils and maximizing the cooling efficiency is to produce a hollow cavity within the airfoil portion of the turbine blade or vane, where the hollow cavity includes internal passageways for directing the cooling fluid through the component as well as surface features to enhance the cooling effectiveness. Due to the geometric constraints of the components, it may be necessary to cast these features into the gas turbine component, as it is not possible to machine many of the complex cooling features into the turbine component.

Figure 1:
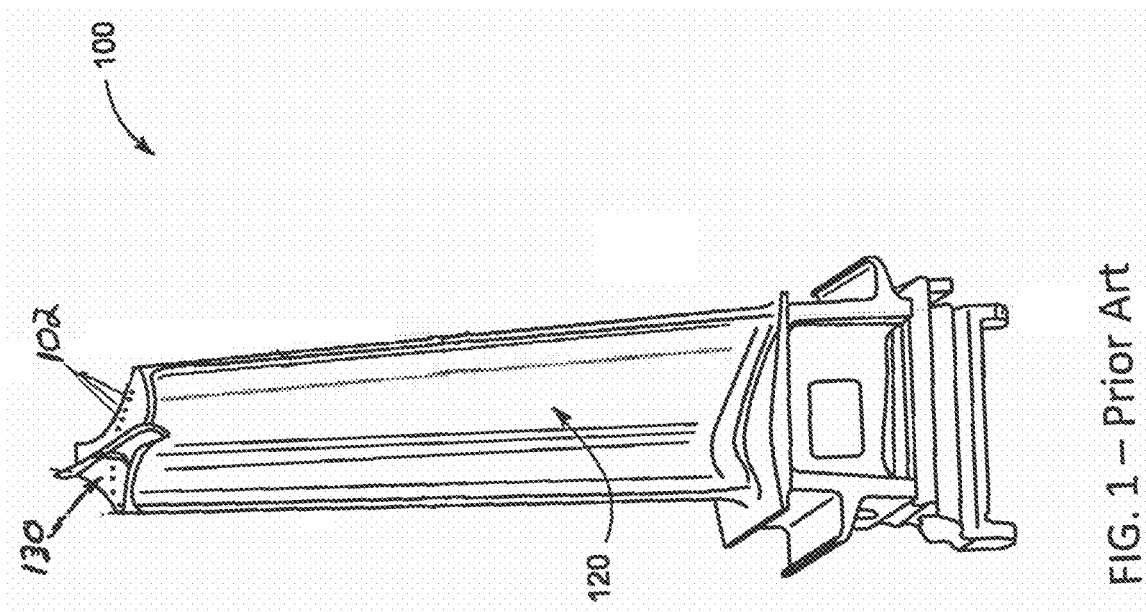
FIG. 1 is a perspective view of a gas turbine blade in accordance with the prior art.
Figure 2:
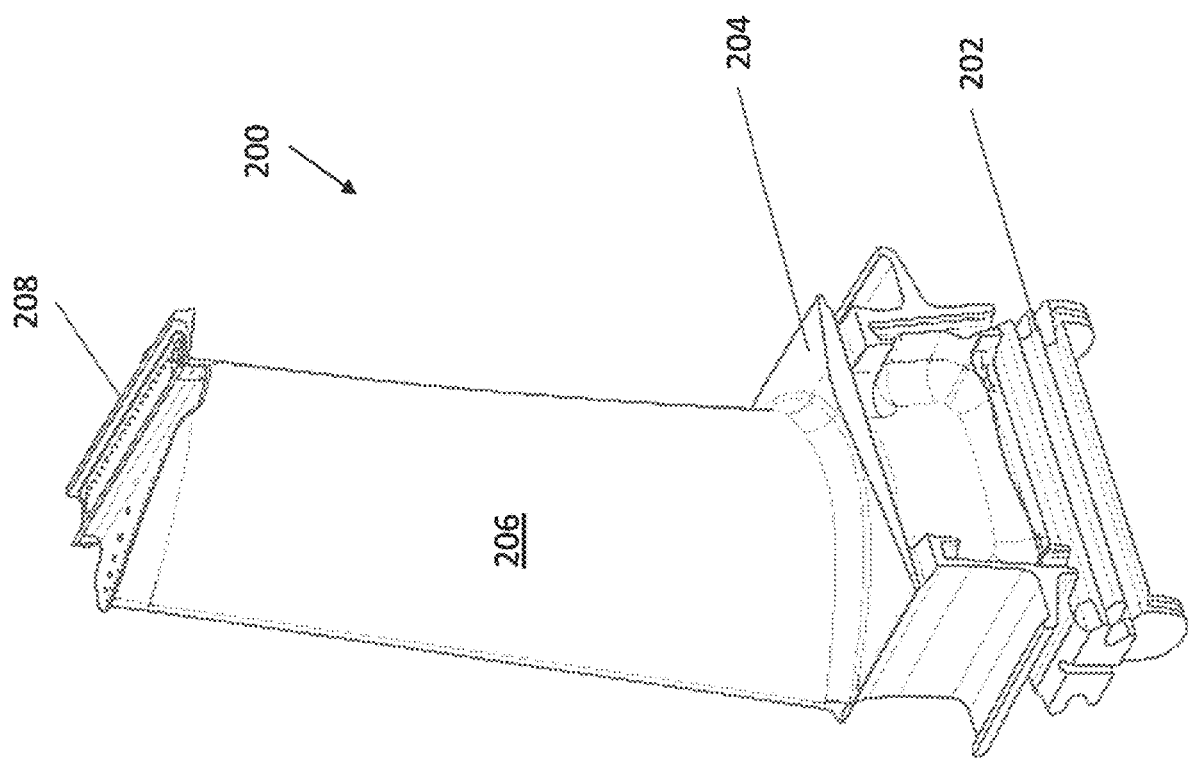
FIG. 2 is a perspective view of a gas turbine blade in accordance with an embodiment of the present disclosure.

Referring initially to FIG. 2-9, various embodiments of the present disclosure are shown. FIG. 2 depicts a turbine blade 200 in accordance with an embodiment of the present disclosure. The turbine blade 200 comprises a blade attachment 202 and a platform 204 extending radially outward from the attachment 202. The blade attachment 202 and platform 204 regions are conventional in nature, as is well known to those of ordinary skill in the art.

The turbine blade 200 also comprises an airfoil 206 extending radially outward from the platform 204 and a tip shroud 208 extending circumferentially from the airfoil 206. The tip shroud 208 has one or more knife edges 210 extending radially outward from an outer surface 218 of the tip shroud 208.

One or more cooling passages 214 extend through the airfoil 206 and to the tip shroud 208. For the embodiment of the present disclosure depicted in FIGS. 2-9, the cooling passages 214 comprise a plurality of stem drilled cooling holes, which as one skilled in the art understands, are a plurality of generally radially extending cooling holes drilled after the turbine blade is cast. The one or more cooling passages 214 may also include internal cooling enhancements to turbulate the flow of cooling air. In an alternate embodiment of the present disclosure, the one or more cooling passages 214 comprises at least one cast airfoil cooling passage, where the cooling passageway is cast into the airfoil. The cast airfoil cooling passage can be a variety of shapes or configurations and may also include other heat transfer features, such as trip strips, pin fins, chevrons, or similar devices.

Referring now to FIGS. 3-5 and 7, the turbine blade 200 also comprises one or more tip plates 216 secured to the tip shroud 208. The one or more tip plates 216 are secured to the tip shroud 208 by a welding or brazing process. For example, the tip plate 216 can be laser welded, tungsten inert gas (TIG) welded, or electron beam (EB) welded to the tip shroud 208. Alternatively, the one or more tip plates 216 can be brazed to the tip shroud 208 by placing a compatible braze filler material between the tip plate 216 and a surface of the tip shroud 208 and putting the turbine blade 200 through a brazing heat treatment cycle, thereby bonding the tip plate 216 to the tip shroud 208. The tip plate 216 can be cut or stamped from a sheet metal having similar material properties to that of the turbine blade 200.

Figure 5:
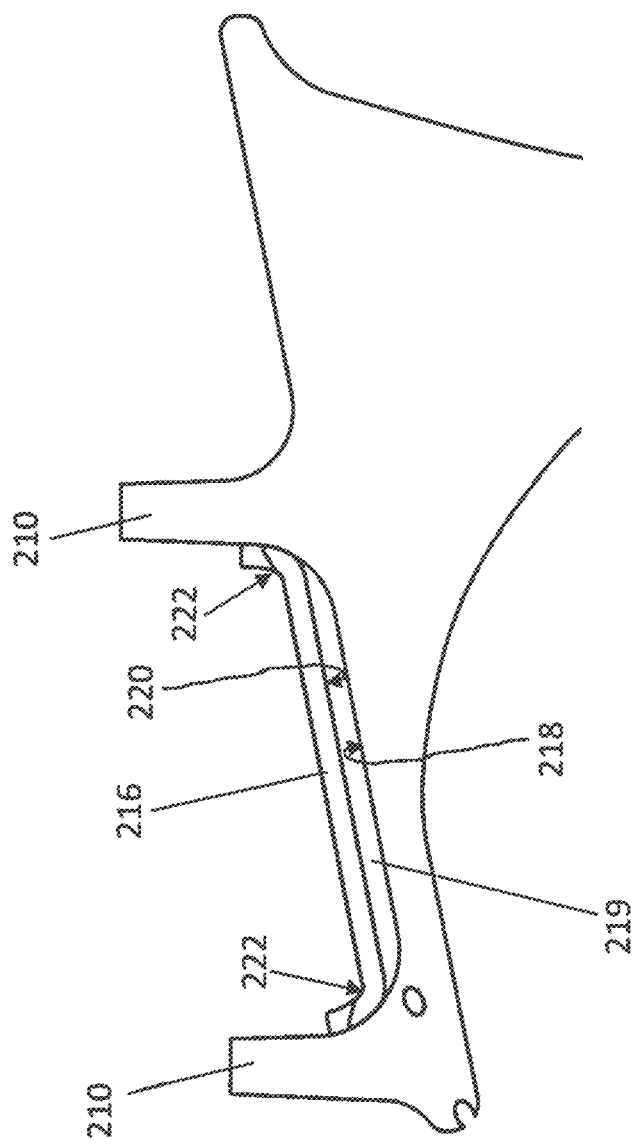
FIG. 5 is a cross section view of the shroud of the gas turbine blade of FIG. 3.

The resulting assembly creates a plenum 219 formed between the tip plate 216 and an outer surface 218 of the tip shroud 208, as shown in FIG. 5. In this configuration, the tip plate 216 has an inner surface 220 that is generally parallel to and adjacent the outer surface 218 of the tip shroud 208. The size and shape of the plenum 219 varies depending on the amount of cooling required for the tip shroud 208.

Figure 7:
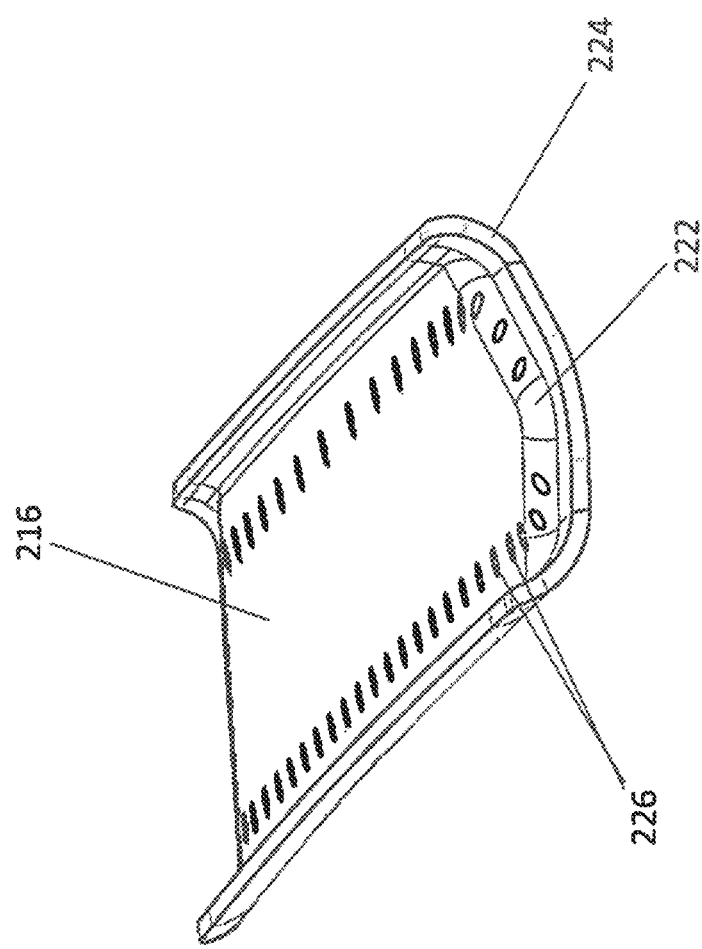
FIG. 7 is a perspective view of a tip plate in accordance with an embodiment of the present disclosure.

Referring now to FIGS. 5 and 7, in an embodiment of the present disclosure, the tip plate 216 further comprises one or more curved edges 222 around at least a portion of a perimeter 224 of the tip plate 216. The curved edges 222 provide a way of improving the attachment location of the tip plate 216 to the tip shroud 208. The radius of the curved edges 222 will vary depending on the configuration of the turbine blade 200 and tip shroud 208, but may lie adjacent to the one or more knife edges 210.

Figure 3:
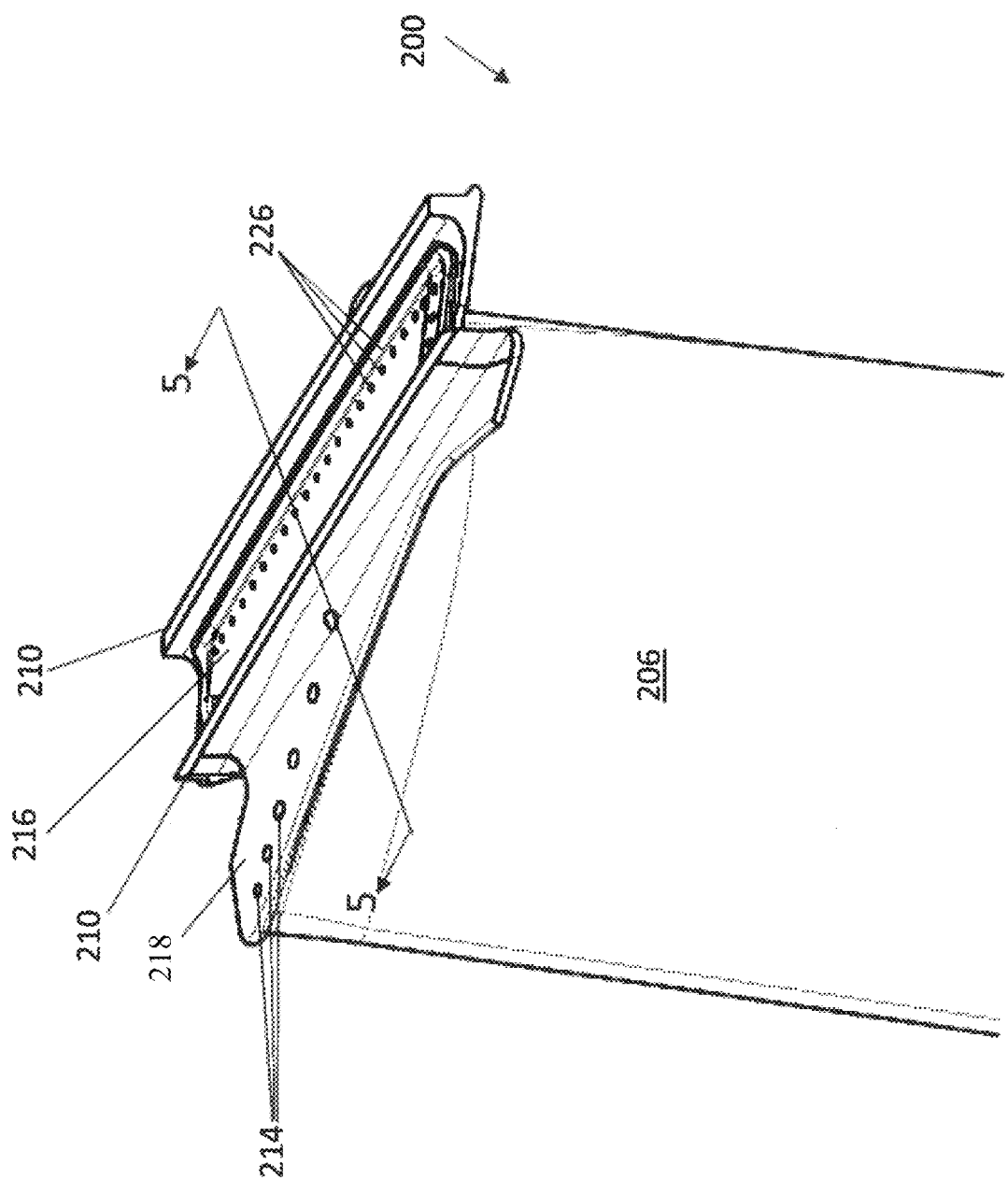
FIG. 3 is a perspective view of a portion of the gas turbine blade of FIG. 2, in accordance with an embodiment of the present disclosure.
Figure 4:
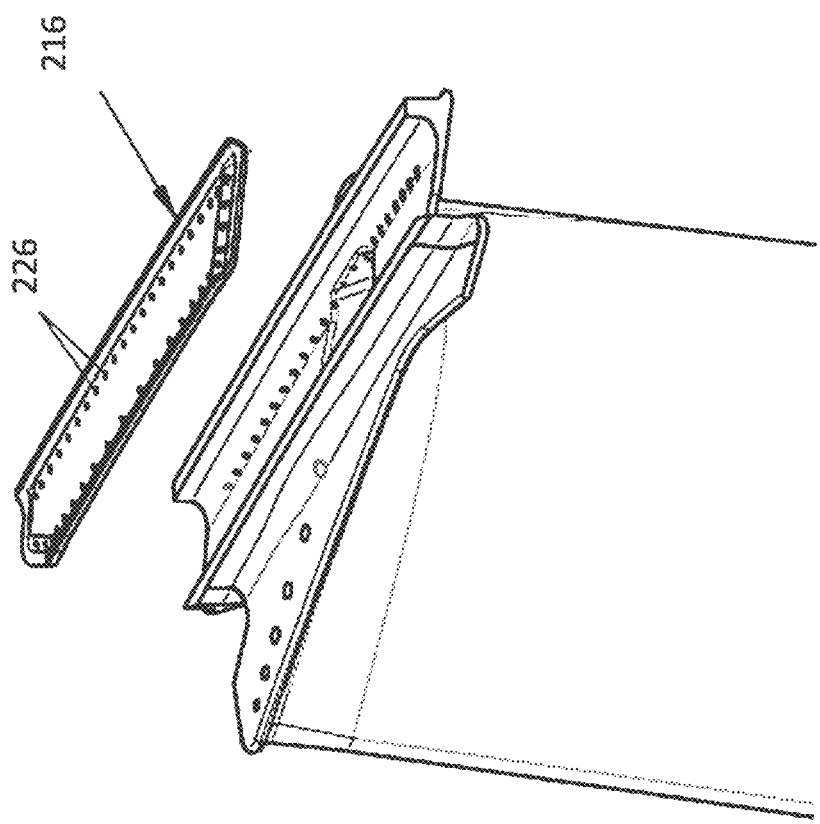
FIG. 4 is an exploded perspective view of the gas turbine blade of FIG. 3.

Referring now to FIGS. 3, 4, and 7, the turbine blade 200 also comprises a plurality of cooling holes 226 in the one or more tip plates 216. The plurality of cooling holes is generally located adjacent a perimeter of the tip plate 216, as shown in FIGS. 4 and 7. Where the cooling holes 226 are located about the perimeter of the tip plate 216, the cooling holes 226 can also be located adjacent one or more of the knife edges 210 of the tip shroud 208. The orientation, size, and spacing of the cooling holes 226 can vary as required in order to effectively cool the portion of the tip shroud 208 encompassed by the tip plate 216. As such, the cooling holes 226 can be oriented generally perpendicular to the tip plate 216 or can be oriented at a surface angle relative to the tip plate 216. The cooling holes 226 are preferably placed in the tip plate 216 before the tip plate 216 is secured to the tip shroud 208. However, the cooling holes 226 can also be drilled in the tip plate 216 after the tip plate 216 is secured to the tip shroud 208. By placing the cooling holes 226 at or near the perimeter of the tip plate 216, cooling air supplied to the plenum 219 is drawn towards and through the cooling holes 226, thus maximizing the cooling area of the tip shroud 208 encompassed by the tip plate 216. This area of the shroud was largely uncooled in prior art turbine blade configurations.

Figure 6:
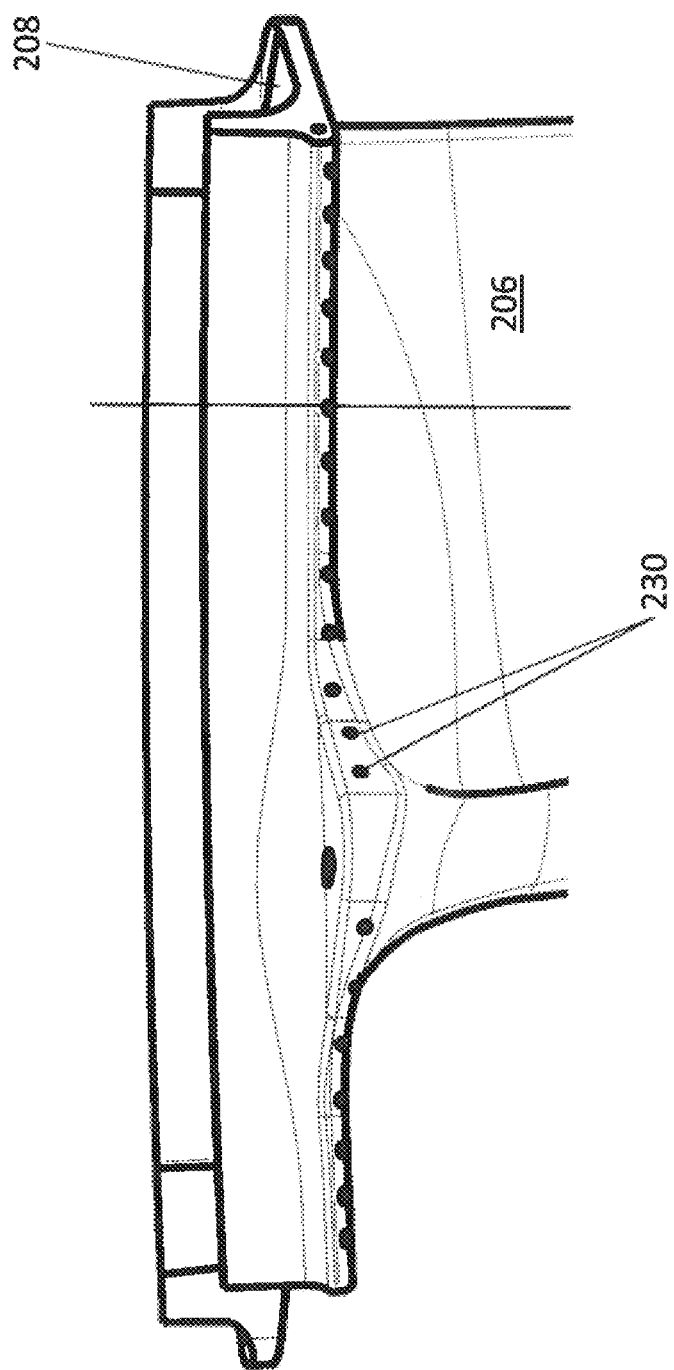
FIG. 6 is an elevation view of a gas turbine blade in accordance with an alternate embodiment of the present disclosure.

Referring now to FIG. 6, in an alternate embodiment of the present disclosure, a plurality of shroud cooling holes 230 are positioned in the outer perimeter of the tip shroud 208. The shroud cooling holes 230 can be drilled in the sidewalls or underside (gas path side) of the tip shroud 208 and communicate with the plenum 219. In this alternate configuration, the cooling air is drawn towards edges of the tip shroud 208 to better cool edge regions of the tip shroud 208.

Figure 8:
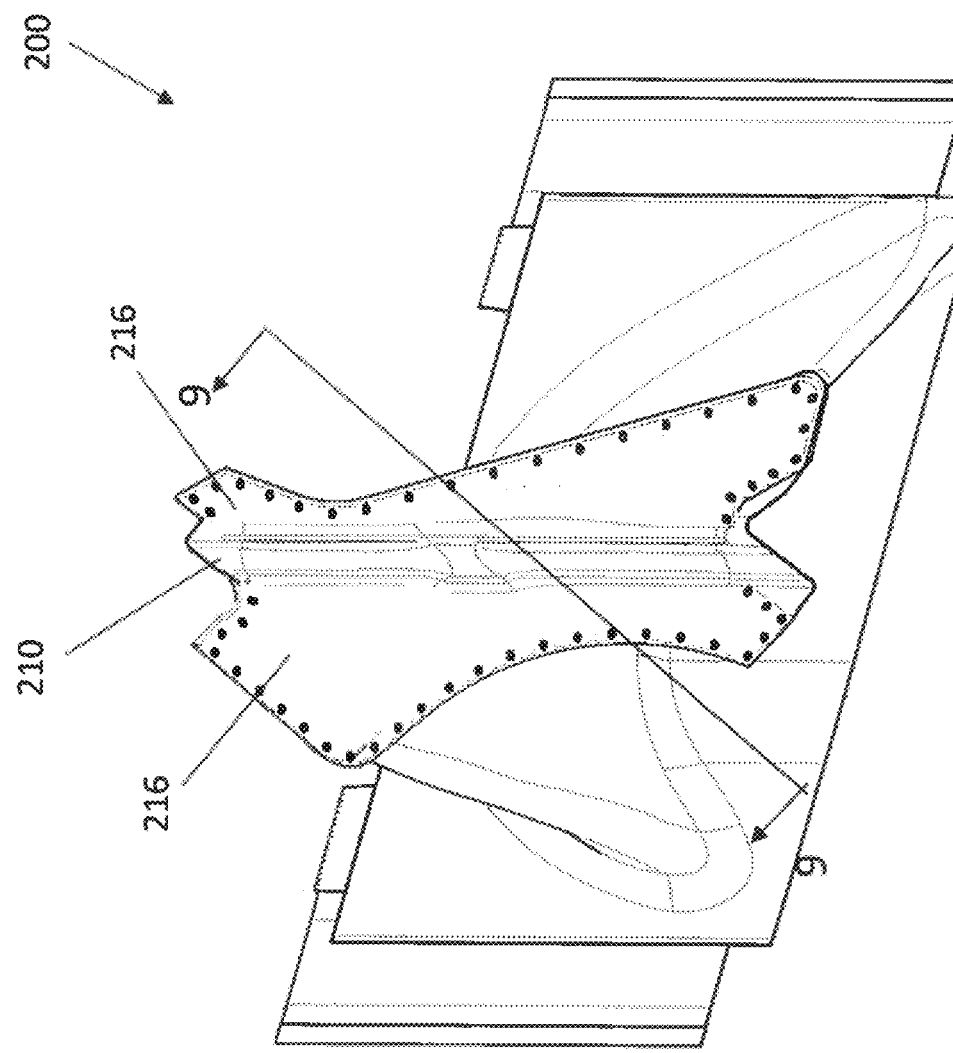
FIG. 8 is a top elevation view of a gas turbine blade in accordance with an alternate embodiment of the present disclosure.
Figure 9:
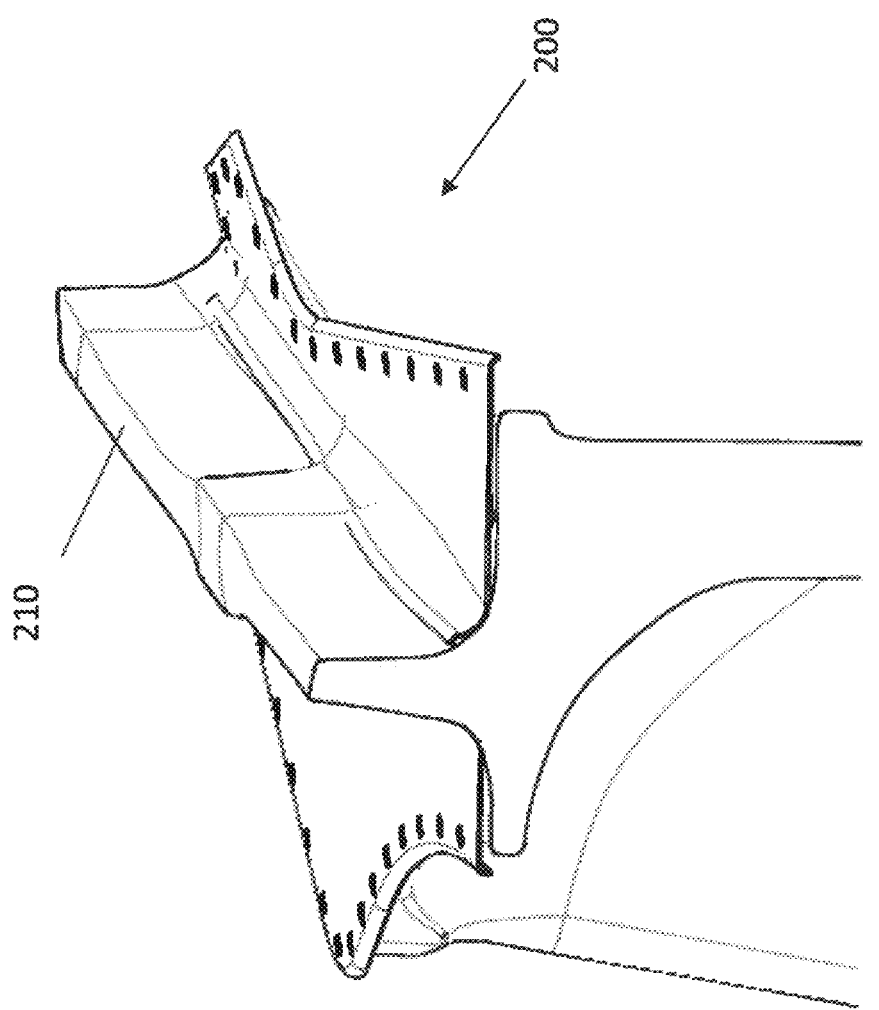
FIG. 9 is a cross section view taken through the gas turbine blade of FIG. 8.

As shown in FIGS. 2-6, the turbine blade 200 contains two knife edges 210 and a tip plate 216 therebetween. An alternate embodiment of the present disclosure is shown in FIGS. 8 and 9, and relates to a turbine blade 200 having a single knife edge 210 and multiple tip plates 216. Cooling holes 226 are positioned about the perimeter of the tip plates 216. A cross section of the tip shroud region of this alternate embodiment is depicted in FIG. 9.

Figure 10:
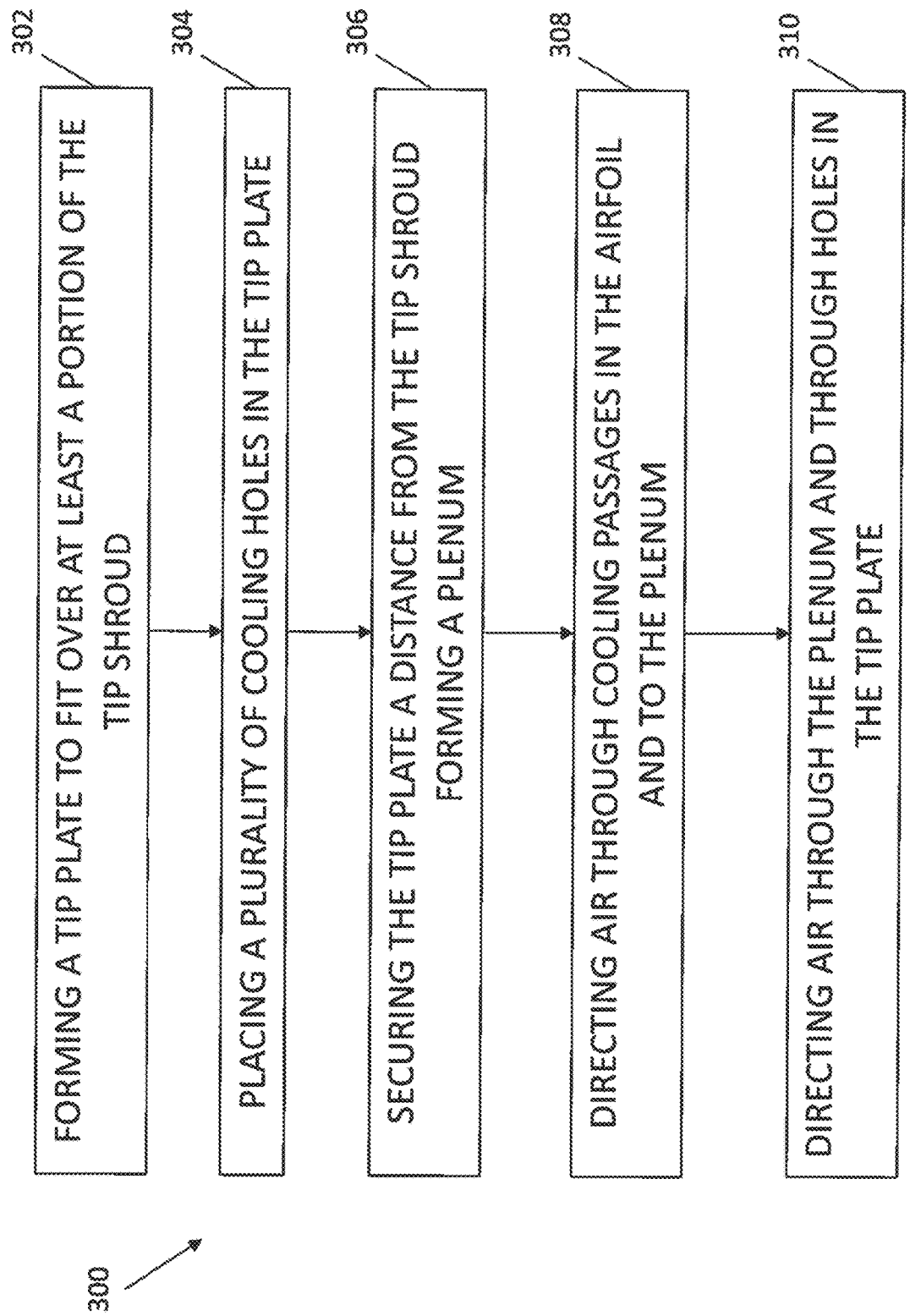
FIG. 10 depicts a method of enhancing cooling of a turbine blade tip shroud in accordance with an embodiment of the present disclosure.

An alternate embodiment of the present disclosure is shown in FIG. 10, where a method 300 of enhancing cooling of a turbine tip shroud is provided. In a step 302, a tip plate is formed and sized to fit over at least a portion of the tip shroud. In a step 304, a plurality of cooling holes is placed in the tip plate and in a step 306, the tip plate is secured a distance from the tip shroud, thereby forming a plenum between the tip plate and the tip shroud. Then, in a step 308, a flow of air is directed through the cooling passages in the airfoil and to the plenum formed between the tip shroud and tip plate. In a step 310, the flow of air is then directed through the plenum and through the plurality of cooling holes in the tip plate to increase cooling fluid to the tip shroud.

Figure 11:
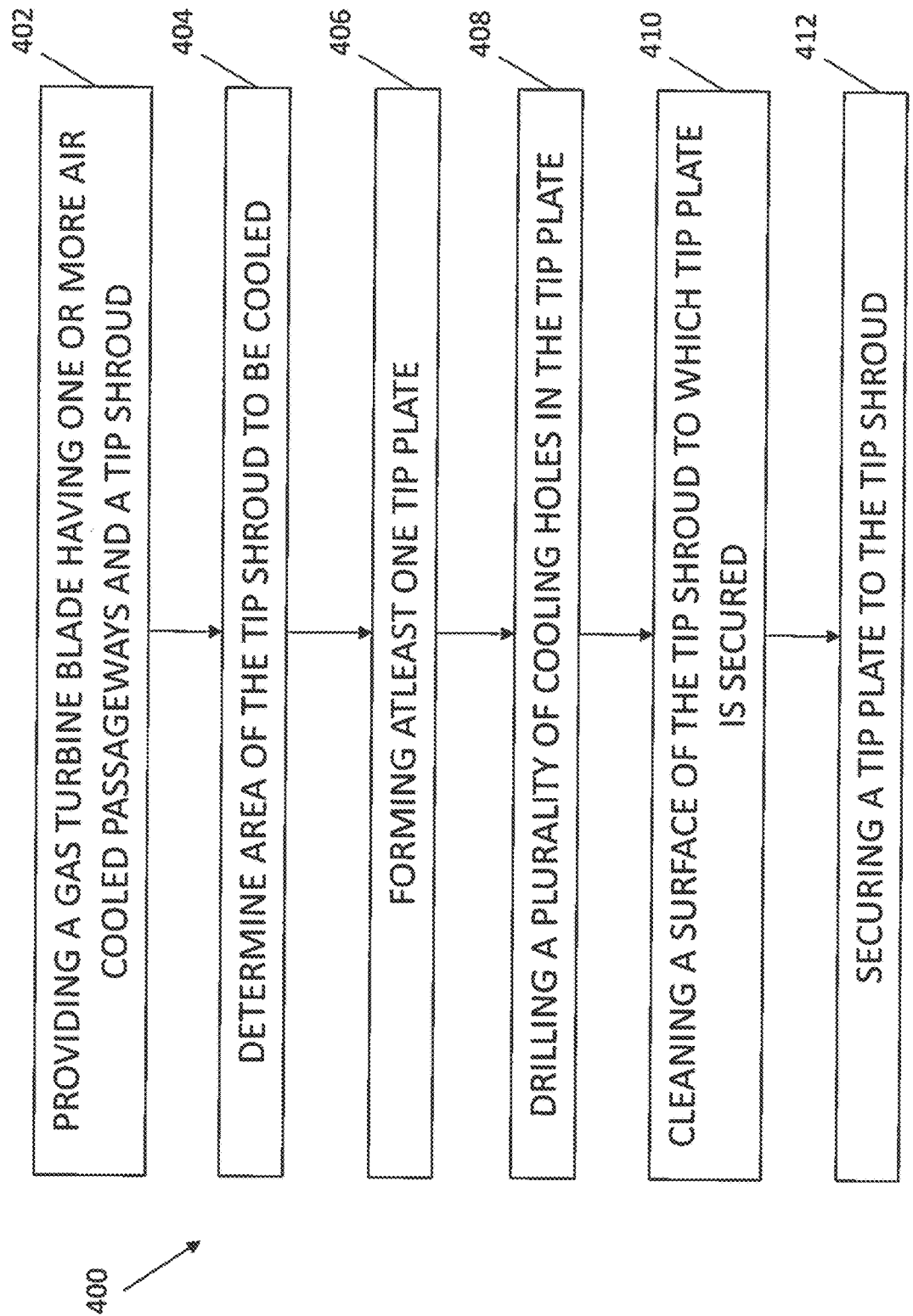
FIG. 11 depicts a method of forming a cooled tip shroud for a gas turbine blade in accordance with an alternate embodiment of the present disclosure.

Referring now to FIG. 11, yet another embodiment of the present disclosure is disclosed and relates to a method 400 of forming a cooled tip shroud for a gas turbine blade. The method 400 comprises the steps of providing a gas turbine blade having an air cooled passageway and a tip shroud in a step 402. In a step 404, the area of the tip shroud to be cooled is determined. The exact size of this area will depend on shroud geometry, operating temperatures, stresses, and resulting curling of the tip shroud. In a step 406, a tip plate is formed, where the tip plate is sized to be positioned over the area of the tip shroud requiring additional active cooling. In a step 408, a plurality of cooling holes is drilled in the tip plate and in a step 410, the surface of the tip shroud to which the tip plate will be secured is cleaned and prepared. In a step 412, the tip plate is fixed to the tip shroud, thereby forming a plenum between the tip shroud and the tip plate.

The apparatus and processes described above can be incorporated into a new turbine blade or as part of a repair process to a previously-operated turbine blade.

Although a preferred embodiment of this disclosure has been disclosed, one of ordinary skill in this art would recognize that certain modifications would come within the scope of this disclosure. For that reason, the following claims should be studied to determine the true scope and content of this disclosure. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this disclosure is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:
1. A turbine blade comprising:
a blade attachment;
a platform extending radially outward from the attachment;
an airfoil extending radially outward from the platform;
a tip shroud extending circumferentially from the airfoil, the tip shroud having one or more knife edges extending radially outward from an outer surface of the tip shroud;
one or more cooling passages extending through the airfoil and to the tip shroud;
one or more tip plates secured to the tip shroud thereby forming a plenum between the outer surface and the one or more tip plates; and,
two sets of cooling holes in each of the one or more tip plates, where each of the two sets of cooling holes includes a plurality of cooling holes that are positioned at least adjacent to and extending along a length of the one or more knife edges, each of the plurality of cooling holes extending through the tip plate perpendicular to a top surface of the tip plate, the two sets of cooling holes collectively extending along an entire perimeter of the tip plate.

2. The turbine blade of claim 1, wherein a first set of cooling holes of the two sets of cooling holes is positioned at least adjacent a first knife edge of the one or more knife edges, and a second set of cooling holes of the two sets of cooling holes is positioned adjacent an opposing second knife edge of the one or more knife edges.

3. The turbine blade of claim 1, wherein the one or more cooling passages are cast into the airfoil.

4. The turbine blade of claim 1, wherein each of the plurality of cooling holes are located along a perimeter of the tip plate.

5. The turbine blade of claim 1 further comprising a plurality of shroud cooling holes located in an outer perimeter of the tip shroud, where the shroud cooling holes are in communication with the plenum.

6. The turbine blade of claim 1 wherein the one or more tip plates is secured to the tip shroud by a welding or brazing process.

7. The turbine blade of claim 6, wherein the tip plate further comprises an upturned edge around at least a portion of a perimeter of the tip plate that mates with the one or more knife edges.

8. The turbine blade of claim 1, wherein the tip plate has an inner surface generally parallel to and adjacent the outer surface of the tip shroud.

9. The turbine blade of claim 1, wherein at least one of the one or more tip plates has a curved outer edge.

10. The turbine blade of claim 9, wherein the curved outer edge is integral with the at least one of the one or more tip plates.

11. The turbine blade of claim 1, wherein each of the one or more tip plates is electron beam welded to the tip shroud.

12. The turbine blade of claim 1, further comprising at least one shroud cooling hole.

13. A method of enhancing cooling of a turbine blade tip shroud comprising:
forming one or more tip plates sized to fit over at least a portion of the tip shroud, the one or more tip plates comprising an upturned edge around at least a portion of a perimeter of the one or more tip plates, the upturned edge being integral with the tip plate;
placing a plurality of cooling holes along an entire perimeter of the one or more tip plates;
securing the one or more tip plates a distance from an outer surface of the tip shroud thereby forming a plenum between the one or more tip plates and the tip shroud outer surface;
directing a flow of air through cooling passages in an airfoil of the blade and to the plenum; and,
directing the flow of air through the plenum and through the plurality of cooling holes in the one or more tip plates.

14. The method of claim 13, wherein the upturned edge is configured to mate with a knife edge of the turbine blade tip shroud.

15. The method of claim 13, wherein the plurality of cooling holes is angled away from a center region of the one or more tip plates.

16. The method of claim 13, wherein the one or more tip plates extend between knife edges of the tip shroud.

17. The method of claim 16, wherein the flow of air is directed from the plenum, through the plurality of cooling holes, and towards the knife edges.

18. The method of claim 13, wherein the one or more tip plates is secured to the tip shroud by a welding or brazing process.

19. The method of claim 13 further comprising placing a plurality of shroud cooling holes in a perimeter of the tip shroud.

* * * * *